US011872176B2

(12) United States Patent
Baldoni et al.

(10) Patent No.: US 11,872,176 B2
(45) Date of Patent: Jan. 16, 2024

(54) EXOSKELETON FOR UPPER ARM

(71) Applicant: SCUOLA SUPERIORE DI STUDI UNIVERSITARI E DI PERFEZIONAMENTO SANT'ANNA, Pisa (IT)

(72) Inventors: Andrea Baldoni, Pisa (IT); Matteo Moisé, Ponte Buggianese (IT); Simona Crea, Lucca (IT); Emilio Trigili, Buccheri (IT); Mario Cortese, Pisa (IT); Nicola Vitiello, Pontedera (IT); Francesco Giovacchini, Pisa (IT)

(73) Assignee: SCUOLA SUPERIORE DI STUDI UNIVERSITARI E DI PERFEZIONAMENTO SANT'ANNA, Pisa (IT)

( * ) Notice: Subject to any disclaimer, the term of this patent is extended or adjusted under 35 U.S.C. 154(b) by 903 days.

(21) Appl. No.: 16/611,255

(22) PCT Filed: May 7, 2018

(86) PCT No.: PCT/IB2018/053151
§ 371 (c)(1),
(2) Date: Nov. 6, 2019

(87) PCT Pub. No.: WO2018/207073
PCT Pub. Date: Nov. 15, 2018

(65) Prior Publication Data
US 2020/0155406 A1    May 21, 2020

(30) Foreign Application Priority Data

May 8, 2017  (IT) ...................... 102017000049732

(51) Int. Cl.
*A61H 1/02*  (2006.01)
*B25J 9/00*  (2006.01)
*B25J 9/06*  (2006.01)

(52) U.S. Cl.
CPC ......... *A61H 1/0281* (2013.01); *A61H 1/0274* (2013.01); *B25J 9/0006* (2013.01);
(Continued)

(58) Field of Classification Search
CPC ............... A61H 1/0277; A61H 1/0285; A61H 1/0237–0244; A61H 1/0262; A61H 3/00;
(Continued)

(56) References Cited

U.S. PATENT DOCUMENTS 7,361,125 B2 * 4/2008 Webber .............. A63B 21/4035
482/130
7,503,884 B1 * 3/2009 Schall ................ A63B 23/1209
482/141

(Continued)

FOREIGN PATENT DOCUMENTS

DE      197 15 555 A1    10/1998
WO   2016/166652 A1    10/2016

OTHER PUBLICATIONS

International Search Report for PCT/IB2018/053151.
Written Opinion for PCT/IB2018/053151.
DE 197 15 555 A—Espacenet English Translation

*Primary Examiner* — Justine R Yu
*Assistant Examiner* — Alexander Morales
(74) *Attorney, Agent, or Firm* — Workman Nydegger

(57) ABSTRACT

A rotational joint of intra-extra rotation for assistance of the movement of intra-extra rotation of a shoulder of a user. The rotational joint features a first circular guide arranged to rotate about a first rotation axis and a second circular guide arranged to rotate about a second rotation axis that is parallel to the first rotation axis. A support element is arranged to (Continued)

support the first and the second circular guides. The first and the second circular guide are pivotally connected by a conical wheel having a third rotation axis perpendicular to the first rotation axes and said conical wheel being pivotally constrained to the support element.

17 Claims, 10 Drawing Sheets

(52) U.S. Cl.
CPC ..... *B25J 9/0045* (2013.01); *A61H 2201/0149* (2013.01); *A61H 2201/149* (2013.01); *A61H 2201/1659* (2013.01); *A61H 2201/1673* (2013.01); *B25J 9/0048* (2013.01); *B25J 9/06* (2013.01)

(58) Field of Classification Search
CPC .......... A61H 1/0281; A61H 2201/0119; A61H 2201/0149; A61H 2201/1215; A61H 2201/1463; A61H 2201/149; A61H 2201/1616; A61H 2201/1638; A61H 2201/1659; A61H 2201/1673; A61F 2002/5069; A61F 2/581; A61F 2/582; A61F 2/585; A61F 2/58; Y10T 403/32008; Y10T 403/32016; Y10T 403/32041; Y10T 403/32049; B25J 9/0006; B25J 9/0045; B25J 9/0048; B25J 9/0063; B25J 9/06; A63B 21/4005; A63B 21/4049; A63B 23/1245–1272
See application file for complete search history.

(56) References Cited

U.S. PATENT DOCUMENTS

| | | | |
|---|---|---|---|
| 9,358,173 B2* | 6/2016 | Fu | A61H 1/02 |
| 10,188,901 B1* | 1/2019 | Cassidy | A63B 21/005 |
| 11,160,715 B2* | 11/2021 | Wang | A61H 3/00 |
| 2007/0137342 A1 | 6/2007 | Hagihara | |
| 2007/0255190 A1 | 11/2007 | Sadok | |
| 2009/0149783 A1* | 6/2009 | Nef | A63B 21/4049 601/5 |
| 2019/0201273 A1* | 7/2019 | Soltani-Zarrin | B25J 9/0006 |
| 2019/0328603 A1* | 10/2019 | Xue | B25J 9/0006 |
| 2019/0365554 A1* | 12/2019 | Davies-Sekle | A61F 5/013 |

* cited by examiner

EXOSKELETON FOR UPPER ARM

FIELD OF THE INVENTION

The present invention relates to the an exoskeleton for neuromotor rehabilitation of the upper limb.

DESCRIPTION OF THE PRIOR ART

The neuromotor rehabilitation of the upper limb, following a neurological event (stroke, brain traumas, spinal injuries) or neurodegenerative diseases (multiple sclerosis, amyotrophic lateral sclerosis) has a fundamental role to allow the person to re-learn the main motor functionalities and regain autonomy in the activity of daily life.

In order to provide long, repeatable rehabilitation treatments that allow to quantify treatment performance, robot-assisted rehabilitation has been proposed for years as an instrument with great potential. Rehabilitation robots can follow two design approaches. On the one hand end-effector robots (e.g. MIT-Manus, Bi-Manu-Track) are characterized by a single point of contact with the person, usually the hand or the wrist, through which they guide, assist, disrupt, train the movement in the space or in the plane of the hand itself. These robots are simple from a mechanical point of view, have low safety requirements, but have the great disadvantage of not being able to control (or measure) the movement of the individual joints of the upper limb, making it impossible to recognize and treat any compensation strategies implemented by the patient to perform the movement. The second category of robots are the exoskeletons (e.g. Arm-In III, LIMPACT), which are characterized by an extensive man-robot interface and the ability to control joint movements of individual joints; the main disadvantage of this approach lies in the complex human-robot interaction, which involves high safety standards to prevent the robot from causing pain to the person or forcing a "non-physiological" movement.

The need to develop safe exoskeletons for the user has led to the development of intelligent software and hardware solutions: these solutions mean that the patient does not interface with the robot in a rigid (stiff) way but with a yielding (compliant) interface. The software solutions are mainly control algorithms that allow to simulate a particular dynamic behaviour of the robot (e.g. in the impedance check we define a "mechanical impedance" reference function that describes the dynamic behaviour of the actuator in the interaction with the patient). The performance of these algorithms depends strongly on the accuracy of the model used, and are based on the force and/or speed/position measurements on the robot. The hardware solutions concern the design of systems that integrate a mechanical "compliance" on the robot: these actuation systems create a mechanically intrinsically safe human-robot interface, even in the event of malfunctions in the control system. Among the hardware solutions, particular attention deserves the so-called series-elastic-actuators, in which a mechanical spring is inserted inside the actuator, in series between the "gear-train" and the load.

Furthermore, in order to develop a device that can become a commercial product, it is necessary to implement solutions that allow the robot to be adapted to different user sizes and different conditions of use (mounted in a rehabilitation gym, on a wheelchair, on a chair), to increase its versatility.

Several exoskeletons have been proposed in the literature for the mobilization of the upper limb, some of which have already become commercial devices and are constantly used in many rehabilitation centres.

However, one of the most felt shortcomings in the devices present in the prior art concerns the possibility of having machines usable both for the right and left limbs, depending on the need of the patient undergoing rehabilitation. Having a single machine that can be used in the right or left configuration has considerable economic implications, as it is more "palatable" from the commercial point of view. Obviously the complexity of the design of such a system can be found in literature: there are very few examples of machines that include all the degrees of freedom of the shoulder (flexion-extension, abdo-adduction and, particularly, intra-extra rotation) and that at the same time they are "invertible", for right or left use.

SUMMARY OF THE INVENTION

It is therefore a feature of the present invention to provide an exoskeleton for assistance of the movement of intra-extra rotation of a shoulder of a user which can be applied to the left or right limb depending on the motor condition of the patient under examination, without any mechanical components being moved, dismantled or screwed by the technical staff.

It is still a feature of the present invention to provide such an exoskeleton that allows adaptation to patients with different anthropometric measurements and motor skills.

It is another feature of the present invention to provide such an exoskeleton that allows correct alignment between the robotic and anatomical joints, allowing the patient to move without suffering parasitic forces which impede the movement.

These and other objects are achieved by an exoskeleton for assistance of the movement of intra-extra rotation of a shoulder of a user comprising a rotational joint of intra-extra rotation, said rotational joint comprising:
  a first circular guide arranged to rotate about a rotation axis r;
  a second circular guide arranged to rotate about a rotation axis r' aligned with the rotation axis r;
  a support element arranged to support the first and the second circular guide;
whose main feature is that the first and the second circular guide are pivotally connected by a conical wheel having rotation axis s perpendicular to rotation axes r and r', said conical wheel being pivotally constrained to the element of stay,
and that when the conical wheel makes a rotation θ about Its rotation axis s, the first circular guide makes a rotation φ about its rotation axis r and, at the same time, the second circular guide makes a rotation φ'=−αφ about its rotation axis r', α being a positive real number.

Substantially, when the conical wheel makes a rotation θ, a rotation φ=kθ (where k is the transmission ratio between the conical wheel and each circular guide) is transmitted in a direction to the first circular guide and in the opposite direction to the other circular guide. This way, for each rotation θ of the conical wheel, the two circular guides have a relative rotation of 2φ.

In particular, the first and the second circular guide comprise respective conical portions arranged to engage directly on the conical wheel for transferring the rotational motion. In this case there is a direct transmission of the motion. The transmission ratio k is given then by the ratio between the primitive radiuses.

Advantageously, the support element comprises at least three first rotating elements and three second rotating elements arranged to force, respectively, the first and the second circular guide to have as only degree of freedom a rotation about the respective rotation axes r and r'.

Advantageously, the exoskeleton comprises a rotational joint of flexion/extension having a rotation axis y arranged in the horizontal plane π, said rotational joint of flexion/extension arranged to assist a movement of flexion/extension of the shoulder of the user.

In particular, the exoskeleton also comprises a second rotational joint of flexion/extension having a rotation axis y', said second rotational joint of flexion/extension arranged to assist a movement of flexion/extension of an elbow of the user.

In particular, the exoskeleton also comprises a rotational joint of abdo-adduction having a rotation axis x arranged in a horizontal plane π passing through an anatomical joint of a shoulder of a user, said rotational joint of abdo-adduction arranged to assist a movement of abdo-adduction of the shoulder of the user.

Advantageously, the exoskeleton also comprises a spacer joint arranged in the horizontal plane π and arranged to connect the rotational joint of abdo-adduction and the rotational joint of flexion/extension for adjusting the distance along a direction parallel to the rotation axis y and/or along a direction parallel to the rotation axis x.

In particular, the spacer joint comprises:
a first translational joint arranged to adjust the distance between the rotational joint of abdo-adduction and the rotational joint of flexion/extension along a direction parallel to the rotation axis y;
a second translational joint arranged to adjust the distance between the rotational joint of abdo-adduction and the rotational joint of flexion/extension along a direction parallel to the rotation axis x.

In particular, the rotational joint of intra-extra rotation is located between the rotational joint of flexion/extension and the second rotational joint of flexion/extension, said rotation axes r and r' being orthogonal to rotation axes y and y', said rotational joint of flexion/extension arranged, in response to a rotation θ of the conical wheel, to provide a relative rotation of 2φ between the rotational joint of flexion/extension and the second rotational joint of flexion/extension about axes r and r'.

Advantageously between the rotational joint of intra-rotation and the second rotational joint of flexion/extension a third spacer joint is provided arranged to adjust the distance between the rotation axis y and the rotation axis y'. This way, it is possible to adjust the engagement point between the exoskeleton and the arm on the basis of the specific anthropometric measurements of the user and allow passive adaptation during the movement of the arm.

Advantageously, the rotational joint of abdo-adduction, the rotational joint of flexion/extension and the second rotational joint of flexion/extension can carry out rotations of 360° about the respective rotation axes, y and y', both clockwise and anti-clockwise. This way, the exoskeleton is completely symmetrical and it can be fixed both to right and left upper limb.

In particular, the rotational joint of intra-extra rotation can carry out a relative rotation of 2φ both clockwise and anti-clockwise.

According to another aspect of the invention, an exoskeletal system is claimed for assistance of the movement of intra-extra rotation of a shoulder of a user comprising an exoskeleton according to claim 1 and a support frame connected to the exoskeleton,
whose characteristic is that the support frame comprises:
a containment shell;
a weight balancing system comprising a slide connected to at least one counterweight by a pulley;
a kinematical chain comprising:
a first link connected to the slide through a first rotational joint having a rotation axis z orthogonal to the rotation axis x, said slide arranged to allow a translation of the first rotational joint along the rotation axis z with respect to the containment shell;
a second link connected to the first link through a second rotational joint having rotation axis z' parallel to the rotation axis z, said second link being connected to the rotational joint of abdo-adduction of the exoskeleton by a third rotational joint having rotation axis z" parallel to the rotation axis z;
in such a way that the rotational joint of abdo-adduction of the exoskeleton is arranged in a plurality of relative spatial positions with respect to the containment shell,
said at least one counterweight having mass equal to the sum of the masses of the kinematical chain and of the exoskeleton, in such a way that the slide maintains its own equilibrium position along the rotation axis z.

Advantageously, the support frame also comprises an engagement system arranged to engage with the support frame to an outer support.

In particular, the outer support can be a wheelchair for the transport of disabled people.

Alternatively, the outer support can be a support that allows the user to stand up.

Alternatively, there is not an outer support and the engagement system allows the support frame to be tied directly to a user's body.

According to a further aspect of the invention, a support frame is claimed arranged to place an exoskeleton of upper limb in a plurality of relative spatial position with respect to an outer support,
whose characteristic is that it comprises:
a containment shell;
a weight balancing system comprising a slide;
a kinematical chain comprising:
a first link connected to the slide through a first rotational joint having a rotation axis z orthogonal to the rotation axis x, said slide arranged to allow a translation of the first rotational joint along the rotation axis z with respect to the containment shell;
a second link connected to first link through a second rotational joint having a rotation axis z' parallel to the rotation axis z, said second link being connected to the exoskeleton of upper limb by a third rotational joint having a rotation axis z" parallel to the rotation axis z;
in such a way that the exoskeleton of upper limb is disposable in a plurality of relative spatial position with respect to the containment shell.

In particular, the slide is connected to at least one counterweight by a pulley, said at least one counterweight having mass such that the slide maintains its own equilibrium position along the rotation axis z.

BRIEF DESCRIPTION OF THE DRAWINGS

Further characteristic and/or advantages of the present invention are more bright with the following description of an exemplary embodiment thereof, exemplifying but not limitative, with reference to the attached drawings in which.

DESCRIPTION OF A PREFERRED EXEMPLARY EMBODIMENT

Figure 1A:
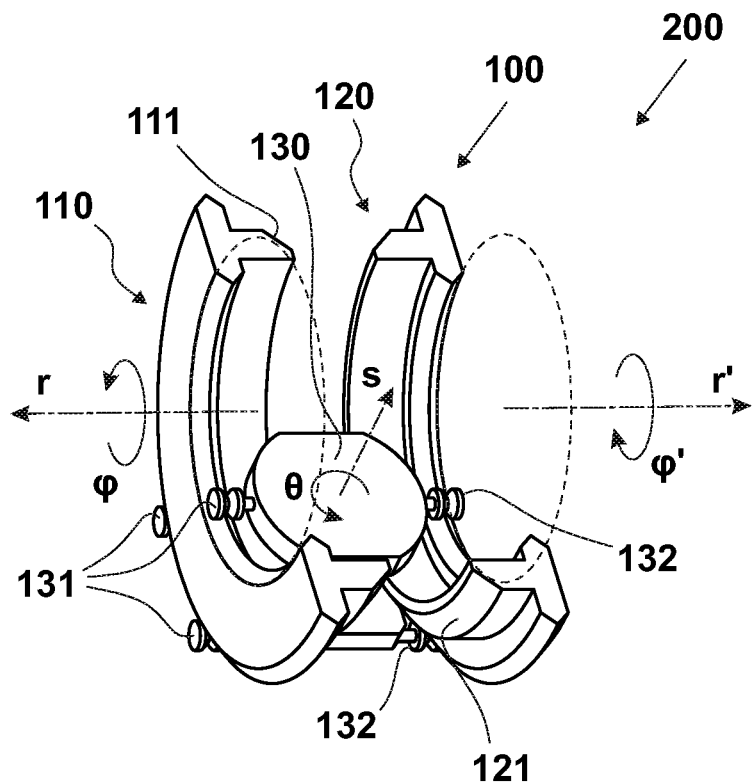
FIG. 1A shows an exemplary embodiment of the rotational joint of intra-extra rotation according to the present invention, in a first configuration.

With reference to FIGS. 1$a$, 1$b$ and 2, an exoskeleton 200 for assistance of the movement of intra-extra rotation of a shoulder of a user comprises a rotational joint of intra-extra rotation 100 having a first circular guide 110 arranged to rotate about a rotation axis r and a second circular guide 120 arranged to rotate about a rotation axis r' parallel to the rotation axis r. The two guides 110,120 are held by a support element 130 that keeps the axes r e r' in place by means of three rotating elements 131 and 132. In particular, the first circular guide 110 is held by three first rotating elements 131, whereas the second circular guide 120 is kept by three second rotating elements 132 arranged symmetrically, as shown in FIG. 1A.

Furthermore, the two circular guide 110,120 are pivotally connected by a conical wheel 140 having a rotation axis S perpendicular to rotation axes r and r', said conical wheel 140 being pivotally constrained to the support element 130.

The rotational joint 100 is configured in such a way that, when the conical wheel 140 makes a rotation θ about its rotation axis s, the first circular guide 110 makes a rotation φ about its rotation axis r and, at the same time, the second circular guide 120 makes a rotation φ'=−αφ about its rotation axis r'.

Substantially, when the conical wheel 140 makes a rotation θ it is transmitted a rotation φ=kθ, where k is the transmission ratio between the conical wheel 140 and each circular guide 110,120. Such rotation φ=kθ is transmitted in a direction to the first circular guide 110 and in the opposite direction at the other circular guide 120. This way, for each rotation θ of the conical wheel 140, the two circular guide 110, 120 have a relative rotation of 2φ.

Figure 1B:
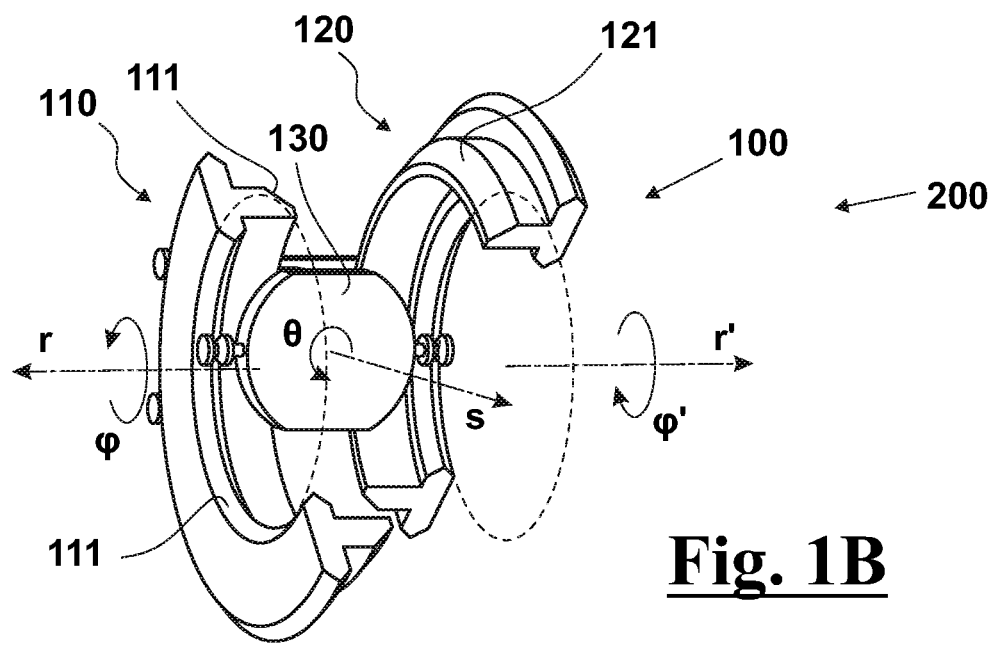
FIG. 1B shows an exemplary embodiment of the rotational joint of intra-extra rotation, according to the present invention, in a second configuration.
Figure 2:
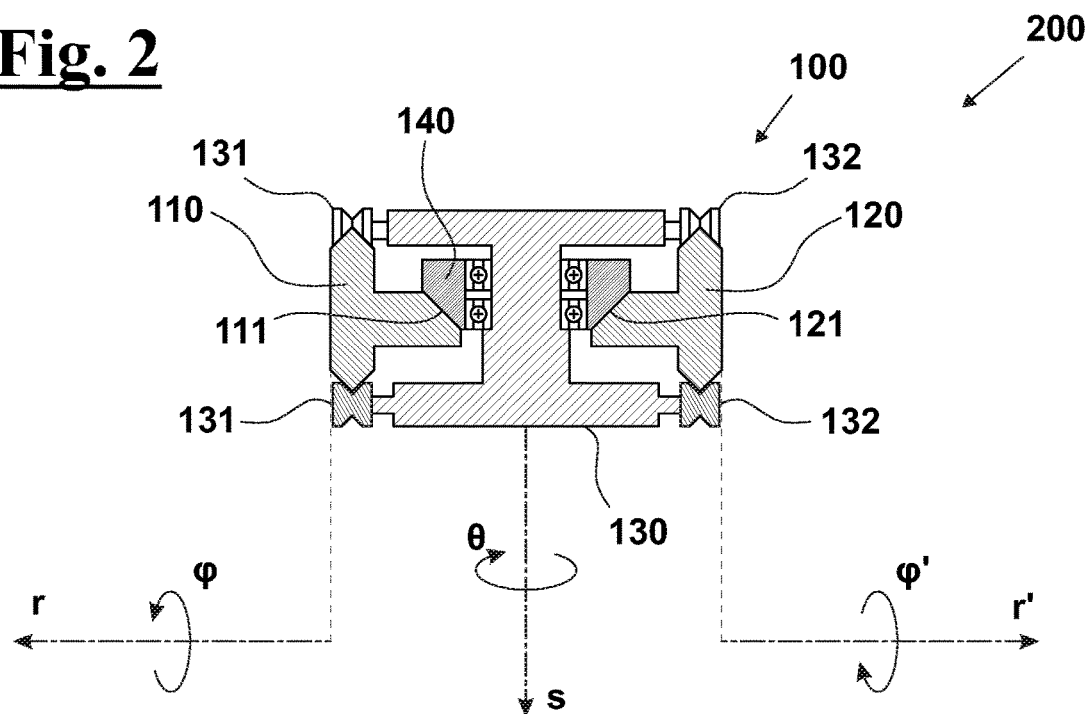
FIG. 2 shows a cross sectional view of an exemplary embodiment of the rotational joint of intra-extra rotation of FIGS. 1A and 1B.

In particular, in an exemplary embodiment of FIGS. 1A, 1B and 2 the first and the second circular guide 110, 120 comprise respective conical portions 111,121 arranged to engage directly on the conical wheel 140 for transferring the rotational motion. In this case, then, the transmission ratio k is the ratio between the primitive radiuses of the conical wheel 140 and of the conical portions 111 and 121 of the circular guide.

Figure 3:
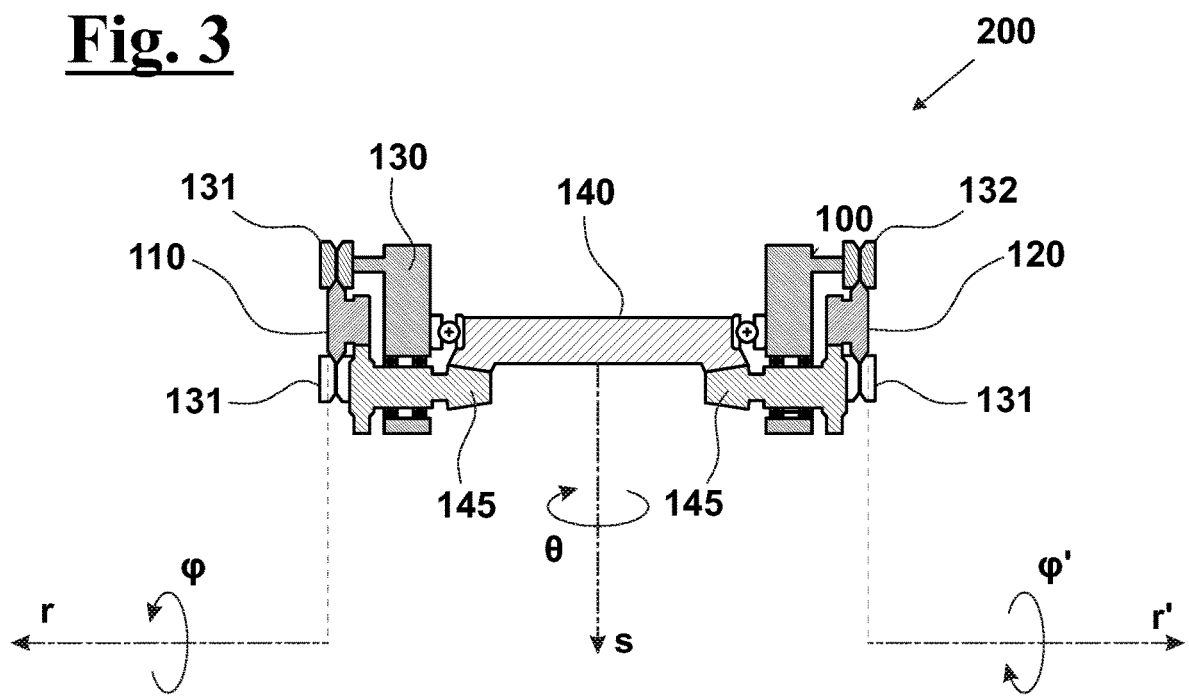
FIG. 3 shows a cross sectional view of an alternative exemplary embodiment of an exemplary embodiment of the rotational joint of intra-extra rotation of FIGS. 1A and 1B.

In FIG. 3 is instead shown an exemplary embodiment of the rotational joint 100 where the conical wheel 140 does not enter in direct contact with the circular guide 110,120. In this case, in fact, the transmission is allowed owing to transmission elements 145 having each a conical portion arranged to enter in connection with the conical wheel 140 and flat portions arranged instead to transmit the movement to the circular guide 110,120. This way, it is possible to provide a transmission ratio k much higher than the one of the exemplary embodiment of FIGS. 1A, 1B and 2. Even in this exemplary embodiment the rotation axes r and r' are maintained in place by three first rotating elements 131 and three seconds rotating elements 132.

Figure 4:
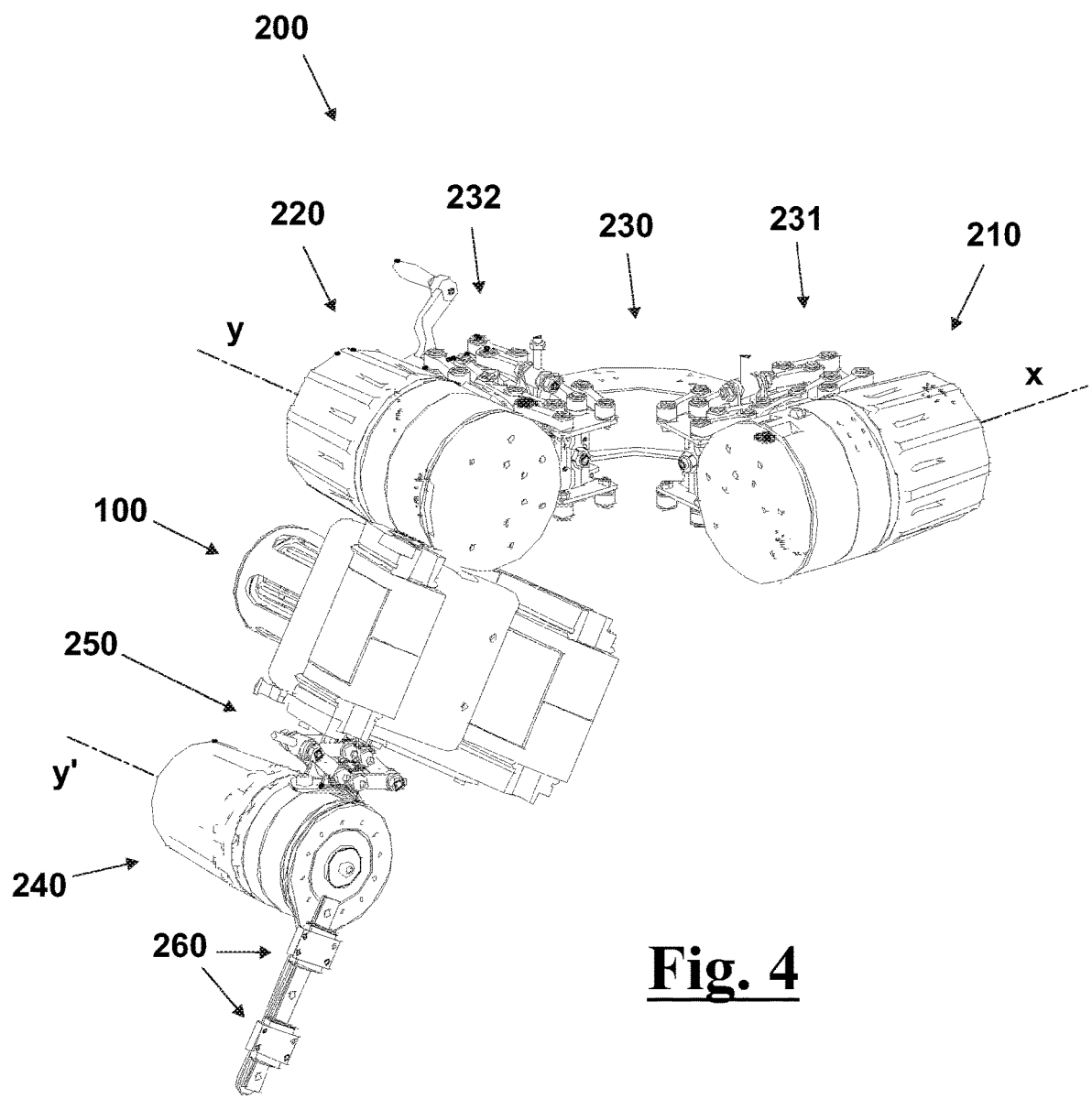
FIG. 4 shows a perspective view of an exemplary embodiment of the exoskeleton, according to the present invention.
Figure 5:
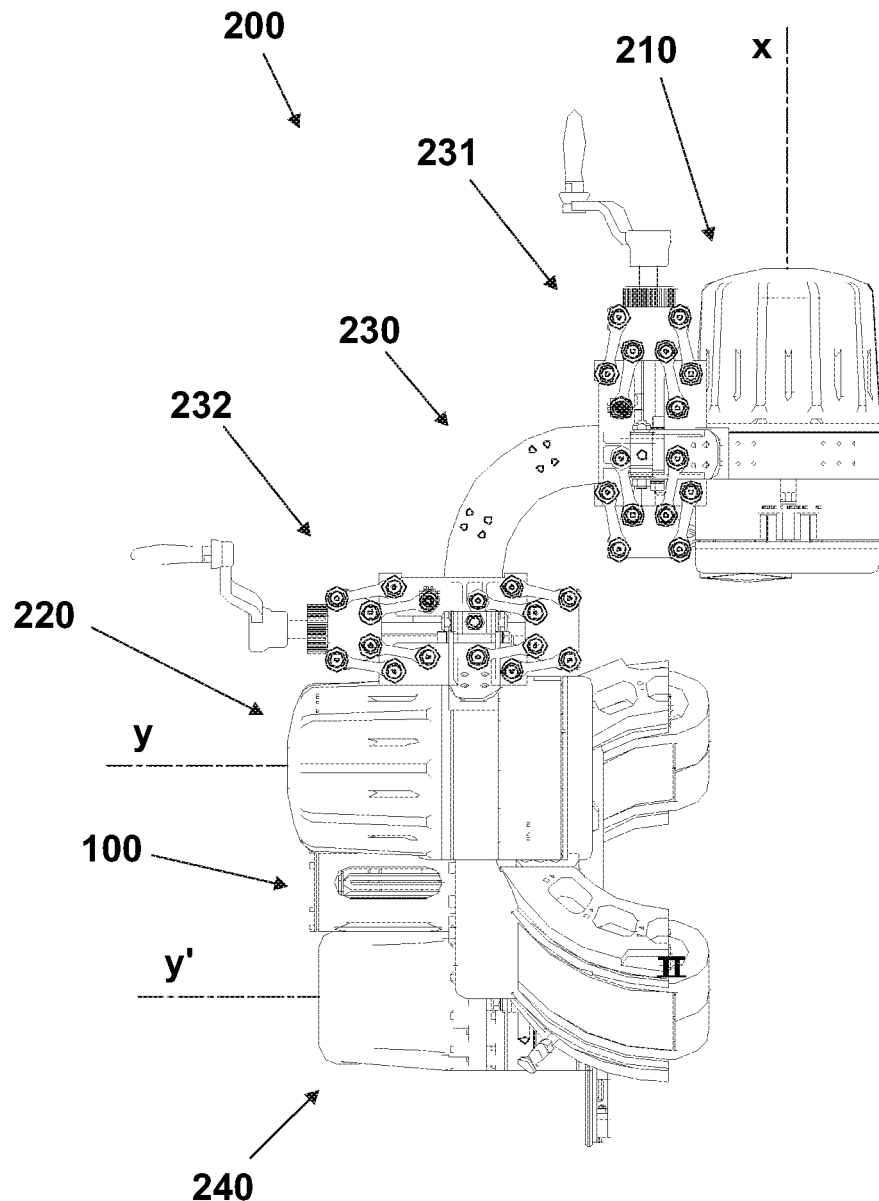
FIG. 5 shows a top plan view an exemplary embodiment of the exoskeleton, according to the present invention.
Figure 6:
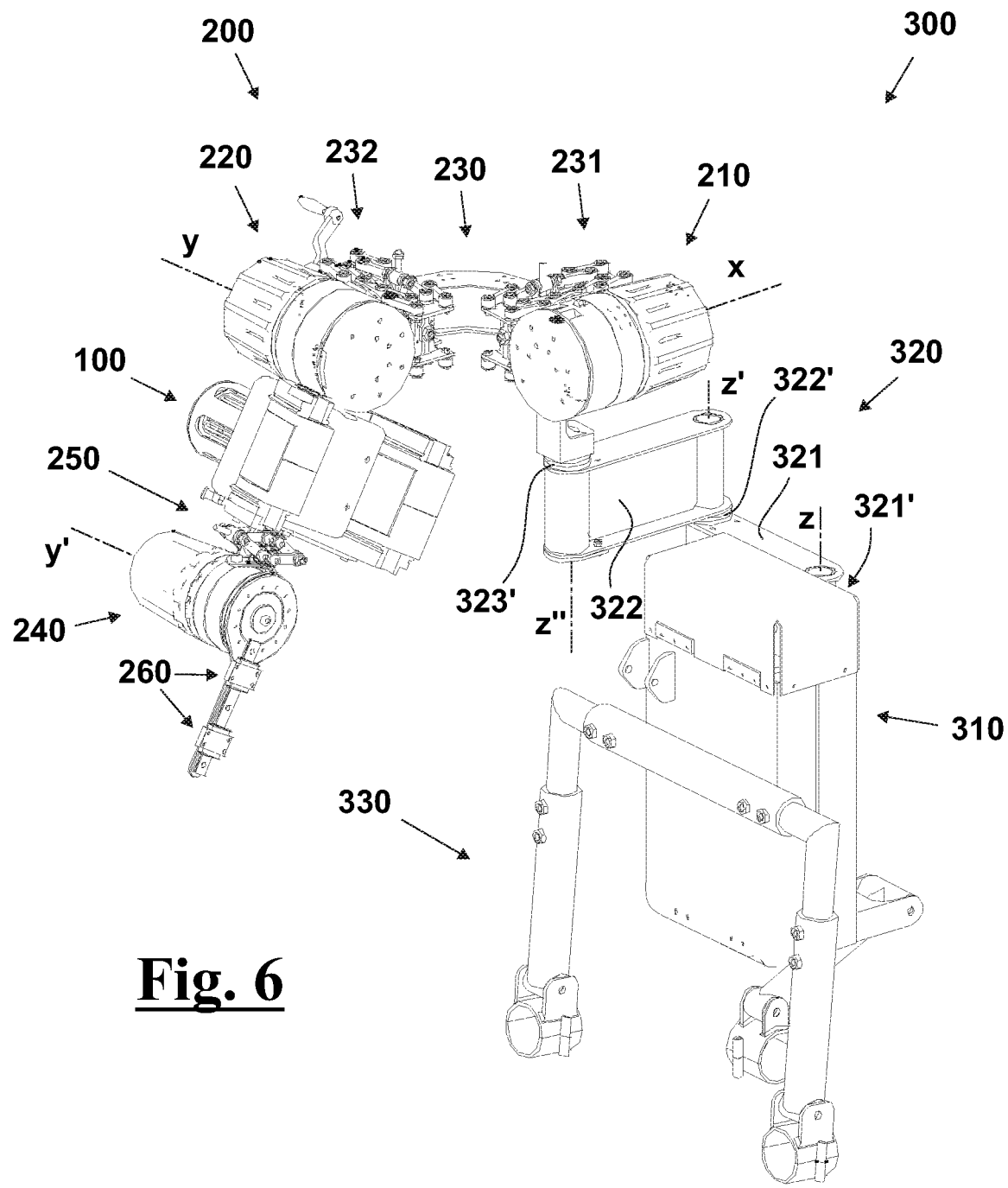
FIG. 6 shows a perspective view of an exemplary embodiment of the exoskeletal system, according to the present invention, comprising exoskeleton and support frame.
Figure 7:
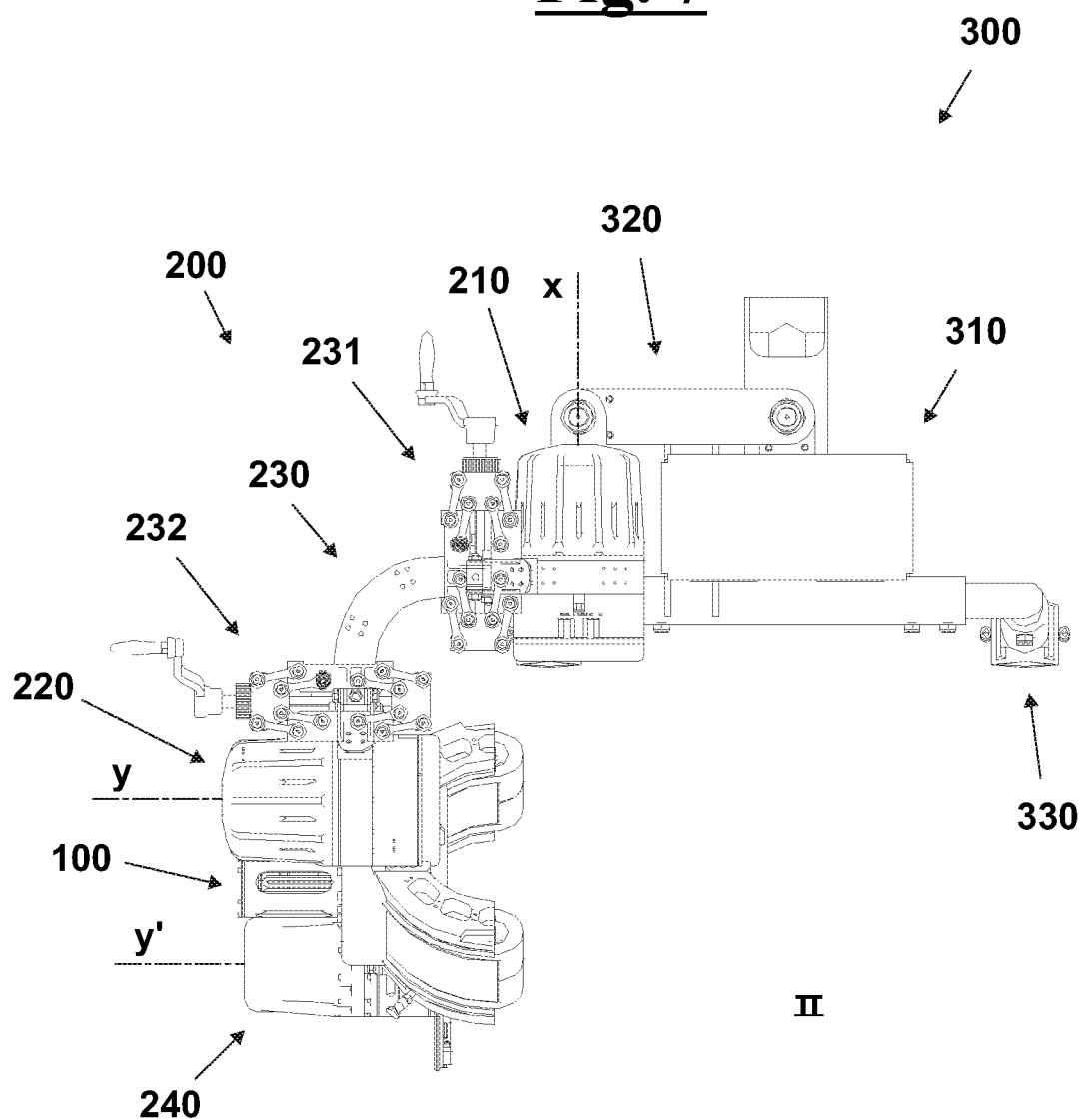
FIG. 7 shows a top plan view an exemplary embodiment of the system according to the present invention comprising exoskeleton and support frame.
Figure 8A:
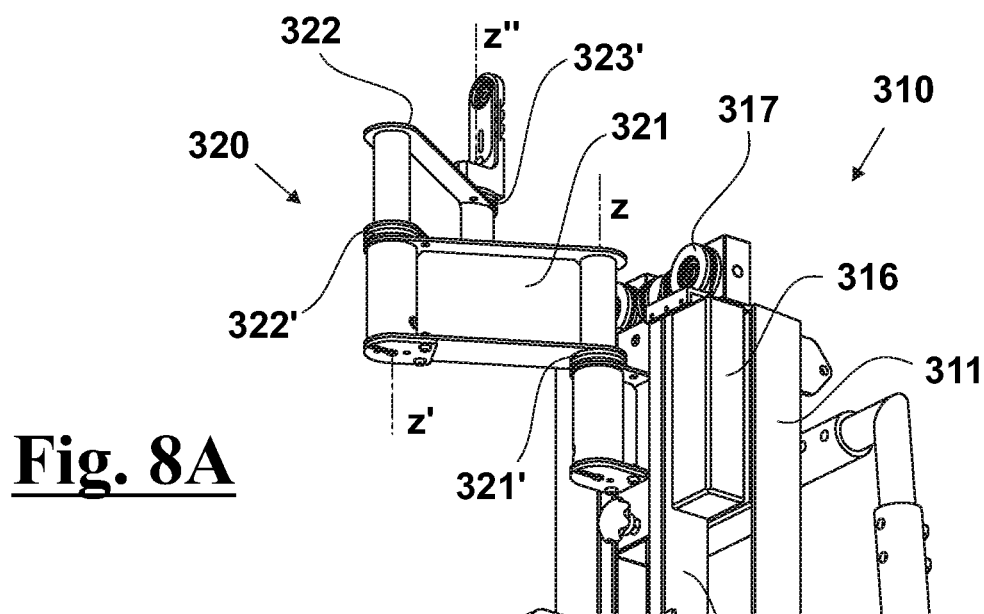
FIG. 8A shows in a first perspective view the support frame.
Figure 8B:
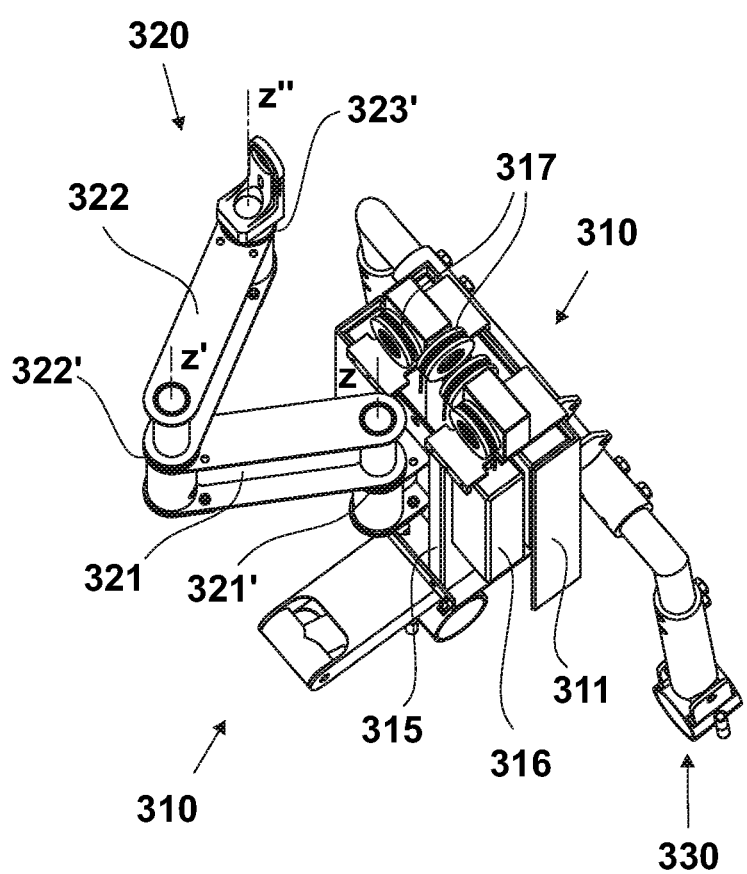
FIG. 8B shows in a second perspective view the support frame.

With reference to FIGS. 4 and 5, in a preferred exemplary embodiment, the exoskeleton 200 comprises, in addition to the rotational joint of intra-extra rotation 100, a plurality of joints for the complete movement of the shoulder and of the limb of a user.

In particular, the exoskeleton 200 comprises a rotational joint of abdo-adduction 210 having a rotation axis x arranged in a horizontal plane π passing through an anatomical joint of a shoulder of a user, said rotational joint of abdo-adduction 210 arranged to assist a movement of abdo-adduction of the shoulder of the user.

It is then provided a rotational joint of flexion/extension 220 having rotation axis y arranged in the horizontal plane π, said rotational joint of flexion/extension 220 arranged to assist a movement of flexion/extension of the shoulder of the user.

The rotational joint of abdo-adduction 210 and a rotational joint of flexion/extension 220 are connected by a spacer joint 230 arranged in the horizontal plane π. In particular, the spacer joint 230 comprises two translational joints 231,231 similar to a car jack. The first translational joint 231 is arranged to adjust the distance between the rotational joint of abdo-adduction 210 and the rotational joint of flexion/extension 220 along a direction parallel to the rotation axis y, whereas the second translational joint 232 is arranged to adjust the distance between the rotational joint of abdo-adduction 210 and the rotational joint of flexion/extension 220 along a direction parallel to the rotation axis x.

Downstream of the rotational joint of flexion/extension 220 a second rotational joint of flexion/extension 240 is then provided having a rotation axis y' parallel to said rotation axis y, said second rotational joint of flexion/extension 240 arranged to assist a movement of flexion/extension of the elbow of the user.

Between the rotational joint of flexion/extension 220 and the second rotational joint of flexion/extension 240 is placed the rotational joint of intra-extra rotation 100 so that the rotation axis s of the conical wheel 140 is parallel to the rotation axis y and to the rotation axis y'.

This way, the rotational joint of intra-extra rotation 100 allows a relative rotation of $2\varphi$ between the rotational joint of flexion/extension 220 and the second rotational joint of flexion/extension 240 about axes r and r', thus allowing to assist the movement of intra-extra rotation of a user's shoulder.

Furthermore, in an exemplary embodiment of FIGS. 4 and 5 can be provided a third spacer joint 250 arranged to adjust the distance between the rotation axis y and the rotation axis y', in order to adapt to different anthropometric measurements of the user's forearm.

In this exemplary embodiment two slides 260 are also provided arranged to be constrained to user's forearm, allowing an adjustment of the point of engagement between exoskeleton and limb on the basis of the particular anthropometric measurements of the user itself and allowing a passive adaptation during the movement of the limb.

With reference to FIGS. 6, 7, 8A and 8B, according to a further aspect of the invention, is claimed an exoskeletal system 300 comprising an exoskeleton 200, as described above, connected to a support frame 300.

In particular the support frame 310 comprises:
a containment shell 311;
a weight balancing system comprising a slide 315 connected to at least one counterweight 316 by a pulley 317;
a kinematical chain 320 comprising:
  a first link 321 connected to the slide 315 through a first rotational joint 321' having a rotation axis z orthogonal to the rotation axis x, said slide 315 arranged to allow a translation of the first rotational joint 321' along the rotation axis z with respect to the containment shell 311;
  a second link 322 connected to first link 321 through a second rotational joint 322' having a rotation axis z' parallel to the rotation axis z, said second link 322 being connected to the rotational joint of abdo-adduction 210 of the exoskeleton 200 by a third rotational joint 323' having a rotation axis z" parallel to the rotation axis z;

This way, the rotational joint of abdo-adduction 210 of the exoskeleton 200 is disposable in a plurality of relative spatial positions with respect to the containment shell 311.

Figure 9:
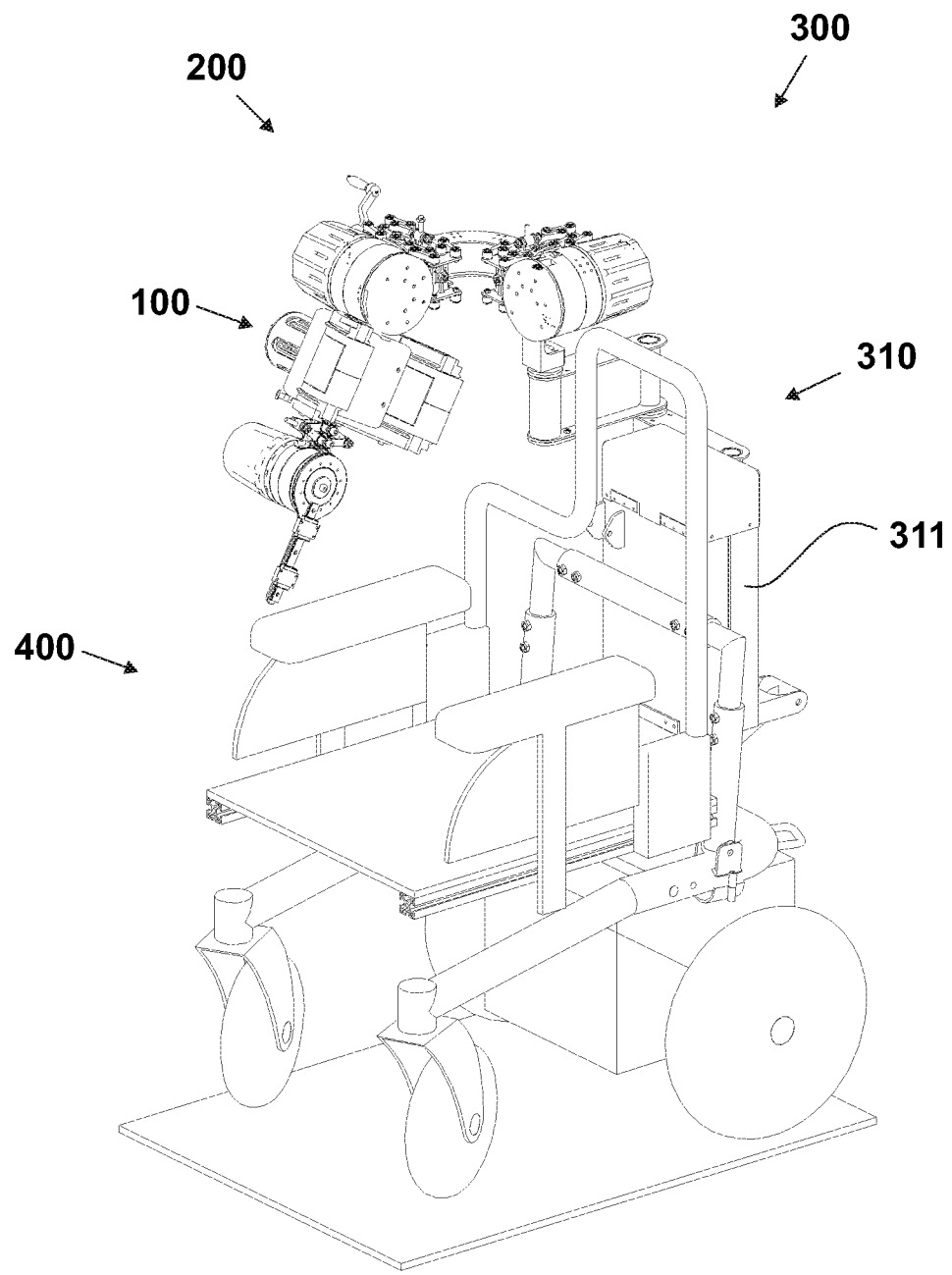
FIG. 9 shows a perspective view of an exemplary embodiment of the exoskeletal system, according to the present invention connected to a wheelchair.
Figure 10:
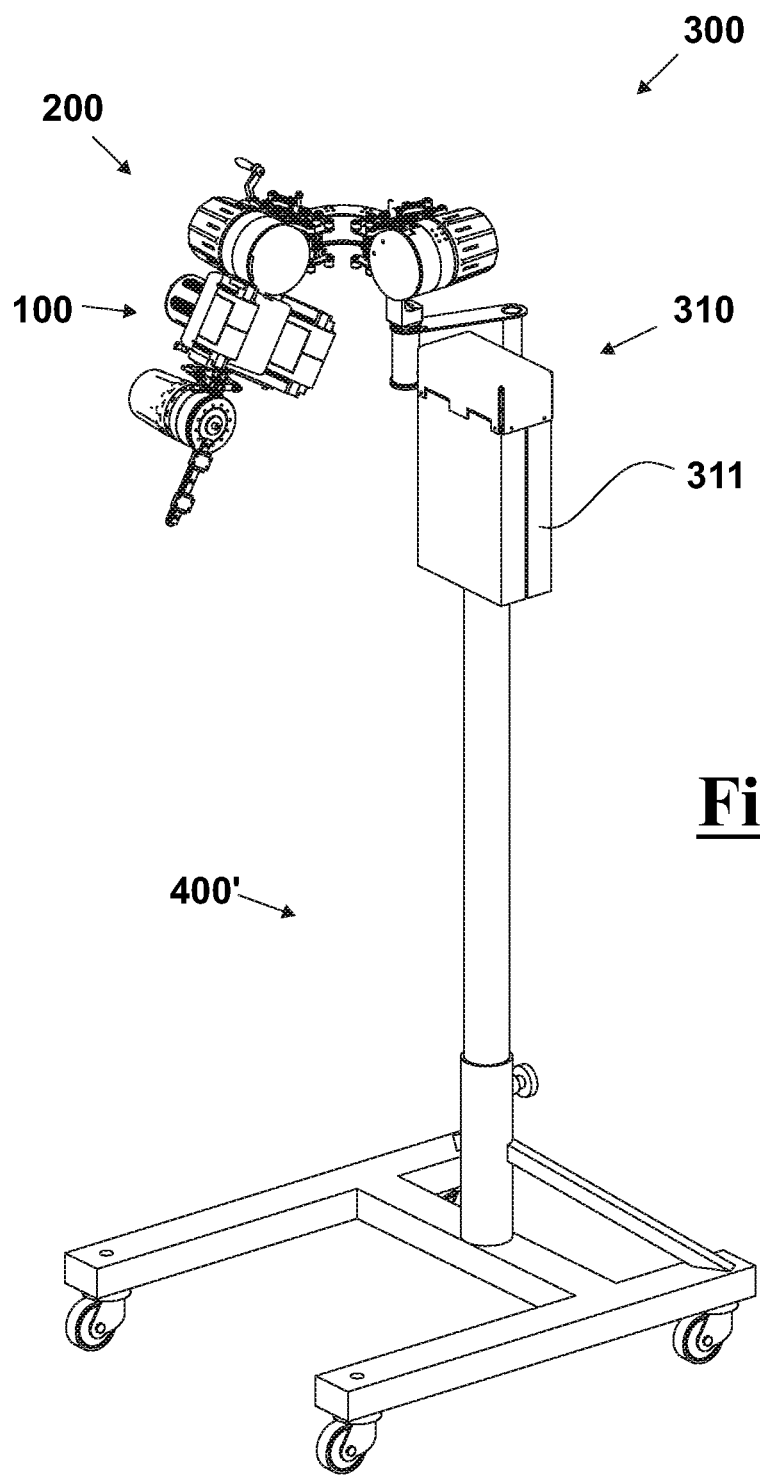
FIG. 10 shows a perspective view of an exemplary embodiment of the exoskeletal system, according to the present invention, connected to a mobile support.

In particular, with reference even at FIGS. 9 and 10, an engagement system 330 can be provided arranged to engage the support frame 310 to an outer support, such as a wheelchair for the transport of disabled persons 400 or a movable support 400'.

Figure 11:
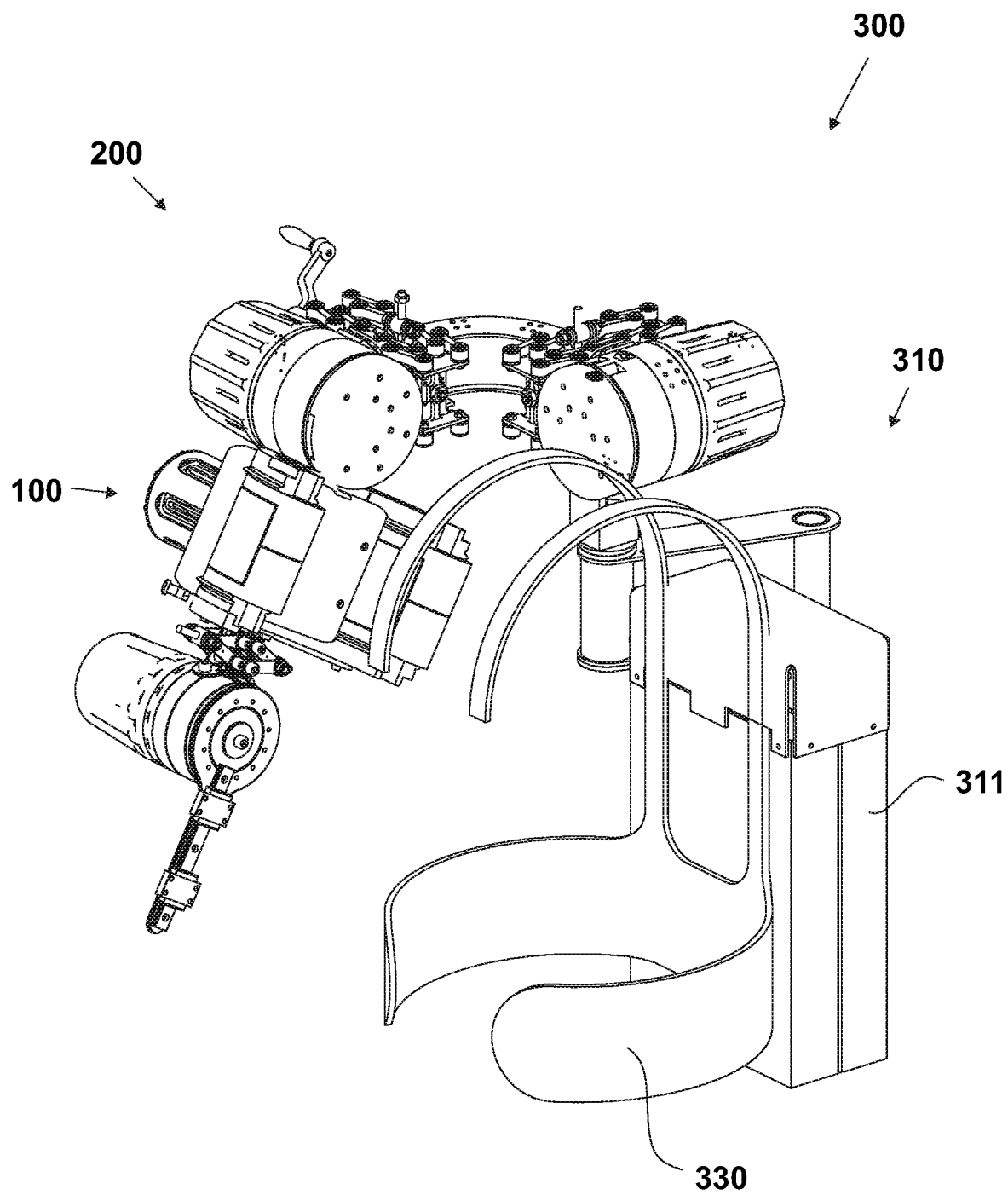
FIG. 11 shows a perspective view of an exemplary embodiment of the exoskeletal system, according to the present invention, where the engagement system allows to engage the frame directly to the body of a user.

Alternatively, with reference to FIG. 11, the engagement system 330, instead of fastening the frame 310 to an outer support, allows engaging it directly to the body of a user.

Furthermore, the exoskeletal system 300 is completely symmetrical and adaptable to assistance of the movement both of the left and right upper limb. In fact the rotational joints 210, 220 and 240 can carry out rotations of 360° about the respective rotation axes x, y and y', both clockwise and anti-clockwise, whereas the rotational joint of intra-extra rotation 100 can carry out a relative rotation of $2\varphi$ both clockwise and anti-clockwise. Furthermore, the rotational joint 321' can carry out a rotation of 180° about its axis z, allowing to arrange the exoskeleton 200 near both the upper limbs of the user.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention, it is to be understood that the phraseology or terminology that is employed herein is for the purpose of description and not of limitation.

The invention claimed is:

1. An exoskeleton for assistance of movement of intra-extra rotation of a shoulder of a user comprising: a support frame (310) connected to a kinematical chain (320) and a rotational joint of intra-extra rotation (100), said rotational joint (100) comprising:
  a first circular guide (110) arranged to rotate about a first rotation axis (r);
  a second circular guide (120) arranged to rotate about a second rotation axis (r') aligned with said first rotation axis (r);
  a support element (130) arranged to support said first and said second circular guide (110, 120);
  wherein the first and said second circular guide (110, 120) are pivotally connected by a conical wheel (140) having a third rotation axis (s) perpendicular to said first and second rotation axes (r) and (r'), said first and second circular guide (110, 120) pivotally constraining said conical wheel (140) to said support element (130),
  wherein said conical wheel (140) is rotatable about said third rotation axis (s) by a first degree of rotation (θ), said first circular guide (110) is rotatable about said first rotation axis (r) by a second degree of rotation ($\varphi$), and said second circular guide (120) is simultaneously rotatable about said second rotation axis (r') by a third degree of rotation ($\varphi'=-\alpha\varphi$, where α is a positive real number).

2. The exoskeleton, according to claim 1, wherein said first and second circular guides (110, 120) comprise respective conical portions (111, 121) arranged to engage directly on said conical wheel (140) for transferring rotational motion between primitive radiuses of the conical portions (111, 121) and the conical wheel (140).

3. The exoskeleton, according to claim 1, wherein said support element (130) comprises at least three first rotating elements (131) and three second rotating elements (132) arranged to force, respectively, said first and said second circular guide (110, 120) to have, as a single degree of freedom a rotation about the respective first and second rotation axes (r) and (r').

4. The exoskeleton, according to claim 1, wherein a rotational joint of flexion/extension (220) is also provided having a first shoulder rotation axis (y) arranged on a horizontal plane (π), said rotational joint of flexion/extension (220) arranged to assist a movement of flexion/extension of said shoulder of said user.

5. The exoskeleton, according to claim 4, wherein a rotational joint of flexion/extension (240) is also provided having an elbow rotation axis (y'), said rotational joint of flexion/extension (240) arranged to assist a movement of flexion/extension of an elbow of said user.

6. The exoskeleton, according to claim 5, wherein said second rotational joint of flexion/extension (240) enables rotations of 360° about the respective elbow rotation axis (y'), both clockwise and anti-clockwise.

7. The exoskeleton, according to claim 5, wherein a rotational joint of abdo-adduction (210) is also provided having a second shoulder rotation axis (x) arranged in a horizontal plane (π) adapted to pass through an anatomical joint of a shoulder of a user, said rotational joint of abdo-adduction (210) arranged to assist a movement of abdo-adduction of said shoulder of said user.

8. The exoskeleton, according to claim 7, wherein said rotational joint of abdo-adduction (210) enables rotations of 360° about the respective second shoulder rotation axis (x), both clockwise and anti-clockwise.

9. The exoskeleton, according to claim 4, further comprising a rotational joint of abdo-adduction (210) having a second shoulder rotation axis (x) arranged in the horizontal plane (π) and adapted to pass through an anatomical joint of the shoulder of a user, said rotational joint of abdo-adduction (210) arranged to assist a movement of abdo-adduction of said shoulder of said user,
wherein a spacer joint (230) is provided on said horizontal plane (π) and arranged to connect said rotational joint of abdo-adduction (210) and said rotational joint of flexion/extension (220) for adjusting a first distance along a first direction parallel to said second shoulder rotation axis (x) and/or for adjusting a second distance along a second direction parallel to said first shoulder rotation axis (y).

10. The exoskeleton, according to claim 9, wherein said spacer joint (230) comprises;
a first translational joint (231) arranged to adjust a distance between said rotational joint of abdo-adduction (210) and said rotational joint of flexion/extension (220) along the second direction parallel to said first shoulder rotation axis (y);
a second translational joint (232) arranged to adjust the distance between said rotational joint of abdo-adduction (210) and said rotational joint of flexion/extension (220) along the first direction parallel to said second shoulder rotation axis (x).

11. The exoskeleton, according to claim 4, further comprising a second rotational joint of flexion/extension (240) having an fifth elbow rotation axis (y'), said second rotational joint of flexion/extension (240) arranged to assist a movement of flexion/extension of an elbow of said user,
wherein said rotational joint of intra-extra rotation (100) is located between said rotational joint of flexion/extension (220) and said second rotational joint of flexion/extension (240), said first and second rotation axes (r) and (r') being orthogonal to said first shoulder and elbow rotation axes (y) and (y'), said rotational joint of flexion/extension (240) arranged, in response to the first degree of rotation (θ) of said conical wheel (140), to provide a relative rotation (2φ) that is twice that of the second degree of rotation (φ) between said rotational joint of flexion/extension (220) and said second rotational joint of flexion/extension (240) about said first and second axes (r) and (r').

12. The exoskeleton, according to claim 11, wherein between said rotational joint of intra-extra rotation (100) and said second rotational joint of flexion/extension (240) is provided a spacer joint (250) arranged to adjust a distance between said first shoulder rotation axis (y) and said elbow rotation axis (y').

13. The exoskeleton, according to claim 4, wherein said rotational joint of flexion/extension (220) enables rotations of 360° about the respective first shoulder rotation axis (y) both clockwise and anti-clockwise.

14. An exoskeletal system (300) for assistance of the movement of intra-extra rotation of a shoulder of a user comprising an exoskeleton according to claim 1, said exoskeletal system (300) characterized in that said support frame (310) comprises:
a containment shell (311);
a weight balancing system comprising a slide (315) connected to at least one counterweight (316) by a pulley (317);
the kinematical chain (320) comprising:
a first link (321) connected to said slide (315) through a first rotational joint (321') having a first vertical rotation axis (z) orthogonal to a shoulder rotation axis (x), said slide (315) arranged to allow a translation of said first rotational joint (321') along said first vertical rotation axis (z) with respect to said containment shell (311);
a second link (322) connected to said first link (321) through a second rotational joint (322') having a second vertical rotation axis (z') parallel to said first vertical rotation axis (z), said second link (322) being connected to a rotational joint of abdo-adduction (210) of said exoskeleton by a third rotational joint (323') having a third vertical rotation axis (z") parallel to said first vertical rotation axis (z);
wherein said rotational joint of abdo-adduction (210) of said exoskeleton (200) is arranged in a plurality of relative spatial positions with respect to said containment shell (311),
said at least one counterweight (316) having a mass equal to a sum of masses of said kinematical chain (320) and of said exoskeleton (200), wherein said slide (315) maintains an equilibrium position along said first vertical rotation axis (z).

15. The exoskeletal system (300), according to claim 14, wherein said support frame (310) also comprises an engagement system (330) arranged to engage with said support frame (310) to an outer support (400, 400').

16. The exoskeleton, according to claim 1, wherein the support frame (310) is arranged to place the rotational joint of intra-extra rotation (100) in a plurality of relative spatial positions with respect to an outer support (400), said support frame (310) characterized in that it comprises:
a containment shell (311)
a weight balancing system comprising a slide (315);
the kinematical chain (320) comprising:
a first link (321) connected to said slide (315) through a first rotational joint (321') having
a first vertical rotation axis (z) orthogonal to a second vertical rotation axis (x), said second vertical rotation axis (x) arranged in a horizontal plane (π) adapted to pass through an anatomical joint of a shoulder of a user, said slide (315) arranged to allow a translation of said first rotational joint (321') along said first vertical rotation axis (z) with respect to said containment shell (311);
a second link (322) connected to said first link (321) through a second rotational joint (322') having a third vertical rotation axis (z') parallel to said first vertical rotation axis (z), said second link (322) being connected to a rotational joint of abdo-adduction (210) of said exoskeleton by a third rotational joint (323') having a fourth vertical rotation axis (z") parallel to said first vertical rotation axis (z);
wherein said rotational joint of abdo-adduction (210) is connected to the rotational joint of intra-extra rotation (100) so that the rotational joint of intra-extra rotation (100) is disposable in a plurality of relative spatial positions with respect to said containment shell (311);
wherein said first rotational joint (321') facilitates a rotation of 180° about said first vertical rotation axis (z) for positioning said rotational joint of intra-extra rotation (100) near left and right upper limbs of the user to assist the movement of both the left and right upper limbs of the user;

wherein the support frame (310) comprises an engagement system (330) connected to the containment shell (311) and arranged to engage the support frame (310) to the outer support (400).

17. The exoskeleton (310), according to claim 16, wherein said slide (315) is connected to at least one counterweight (316) by a pulley (317), said at least one counterweight (316) having a mass and said slide (315) maintains an equilibrium position along said first vertical rotation axis (z).

* * * * *